(12) United States Patent
Klimmek et al.

(10) Patent No.: US 11,726,455 B2
(45) Date of Patent: Aug. 15, 2023

(54) INTERFACE ARRANGEMENT FOR CONNECTING AT LEAST ONE CONTROL DEVICE TO A PLURALITY OF FIELD INSTRUMENTS

(71) Applicant: Phoenix Contact GmbH & Co. KG, Blomberg (DE)

(72) Inventors: Benjamin Klimmek, Aerzen (DE); Felix Schulte, Geseke (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 17/772,768

(22) PCT Filed: Oct. 27, 2020

(86) PCT No.: PCT/EP2020/080184
§ 371 (c)(1),
(2) Date: Apr. 28, 2022

(87) PCT Pub. No.: WO2021/083896
PCT Pub. Date: May 6, 2021

(65) Prior Publication Data
US 2022/0342393 A1    Oct. 27, 2022

(30) Foreign Application Priority Data

Oct. 29, 2019  (LU) .................................. LU101459
Dec. 19, 2019  (LU) .................................. LU101568

(51) Int. Cl.
*G05B 19/4155*    (2006.01)

(52) U.S. Cl.
CPC ................ *G05B 19/4155* (2013.01); *G05B 2219/31368* (2013.01)

(58) Field of Classification Search
CPC ............ H02H 9/02; H02H 9/04; H02H 9/042; H02H 9/043; H02H 9/044; H02H 9/045;
(Continued)

(56) References Cited

U.S. PATENT DOCUMENTS

| 6,071,126 A * | 6/2000 | Daoud | .................. | H02H 9/044 439/54 |
| 6,501,634 B1 * | 12/2002 | Hubbell | ................. | H02H 9/042 361/103 |

(Continued)

FOREIGN PATENT DOCUMENTS

| EP | 3149550 A1 | 4/2017 |
| EP | 3149550 B1 | 12/2018 |
| WO | 2015/187687 A1 | 12/2015 |

OTHER PUBLICATIONS

English translation of the International Preliminary Report on Patentabiity issued in PCT application No. PCT/EP2020/080184, dated May 3, 2022, 8 pp.

(Continued)

*Primary Examiner* — Nguyen Tran
(74) *Attorney, Agent, or Firm* — Kaplan Breyer Schwarz, LLP (57) ABSTRACT

An interface arrangement for connecting at least one control device to a plurality of field instruments, includes: a carrier board having a plurality of signal channels, and a connector designed for electrical and mechanical connection to a second, complementary connector of a signal processing device, being arranged between a first and a second connecting device of each signal channel. Each signal channel has an electrical interface which is designed for releasable connection of respective surge protection modules, each interface electrically connected to an electrical resistor and to a surge arrester which is arranged at least partially on (Continued)

and/or in the carrier board and is designed for arresting surge voltages and/or surge currents which may occur.

14 Claims, 4 Drawing Sheets

(58) Field of Classification Search
CPC .. H02H 7/24; H02H 3/08; H02H 3/10; H02H 3/105; H02H 1/04; H02H 1/043; H02H 1/066; G05B 19/4155; G05B 2219/31368
See application file for complete search history.

(56) References Cited

U.S. PATENT DOCUMENTS

| | | |
|---|---|---|
| 10,360,125 B2 | 7/2019 | Vanderah et al. |
| 2010/0077111 A1 | 3/2010 | Holmes et al. |
| 2016/0043544 A1* | 2/2016 | Naughton ............ H03K 5/2463 361/56 |

OTHER PUBLICATIONS

Office Action issued in Indian patent application No. 202237023742, dated Sep. 23, 2022, 6 pp.
International Search Report issued in PCT application No. PCT/EP2020/080184, dated Feb. 1, 2021, 2 pp.

* cited by examiner

INTERFACE ARRANGEMENT FOR CONNECTING AT LEAST ONE CONTROL DEVICE TO A PLURALITY OF FIELD INSTRUMENTS

FIELD

The invention relates to an interface arrangement for connecting at least one control device to a plurality of field instruments, the interface arrangement being usable in particular in process control systems, such as industrial automation systems.

BACKGROUND

In process control automation systems, field signals from field instruments are routed to a control room via a master cable. Here the signal lines of the master cable must be sorted according to their signal types. This is called marshalling. In addition to sorting the signal types, a signal conversion may also have to be carried out using an appropriate interface module. Signal conversions can be carried out, for example, by means of a relay, which converts voltages at the field level of, for example, 230V into voltage levels with which process control systems work, of, for example, 24V.

A universal I/O interposer system is known from EP 3 149 550 A1, which processes I/O signals that are transmitted between an I/O instrument and a controller. The known interposer system comprises a carrier board on which a connecting device for connection of a field instrument and a connecting device for connection of a control device are arranged. As FIG. 9 of EP 3 149 550 B1 shows, a signal channel runs between the two connecting devices, which signal channel comprises a connecting device on the carrier board, onto which a signal processing device, for example a relay, can be plugged. Furthermore, a manually operable safety device for the purposeful interruption of the signal channel can be arranged therein.

SUMMARY

The invention is based on the object of providing an interface arrangement for connecting at least one control device to a plurality of field instruments, which can be operated flexibly and inexpensively with or without surge protection devices, with high currents caused by surge voltages being discharged via the carrier board without influencing the field signals transmitted via the interface arrangement.

The above-mentioned technical problem is solved by the features of claim 1.

The interface arrangement is designed in particular for connection of at least one control device to a plurality of field instruments. Field instruments can be sensors and/or actuators, while the control device can be a programmable logic controller (PLC), for example.

According to a first aspect, the interface arrangement comprises a carrier board having a plurality of signal channels, each of which has a first connecting device and a second connecting device, the first connecting devices being designed for connection of a respective field instrument and the second connecting devices being designed for connection of at least one control device. A first connector is arranged between the first and second connecting device of each signal channel and is designed for electrical and mechanical connection to a second, complementary connector of a signal processing device. The signal processing device can be a signal converter, for example, which can convert voltages at the field level into a defined voltage level with which process control systems work. Furthermore, each signal channel has an electrical interface which is designed for releasable, preferably pluggable connection of respective surge protection modules and is arranged on the carrier board between the respective first connector and the respective first connecting device. For example, each interface can have at least two connecting contacts to which an electrical resistor can be connected. Each interface is connected to an electrical resistor. Furthermore, a surge arrester is electrically connected to the interfaces, the surge arrester being arranged at least partially on and/or in the carrier board and being designed for arresting surge voltages and/or surge currents which may occur, preferably only via the carrier board.

In order to achieve a space-saving and efficient arrangement on the carrier board, the signal channels are arranged parallel to one another. Furthermore, each signal channel has at least one first signal line portion, which extends from the first connecting device of the respective signal channel to the first connector and into which the electrical resistor of the respective signal channel is connected. Each signal channel has at least one second signal line portion, which electrically connects the second connecting devices of the respective signal channel directly or indirectly to the respective first connector. The first connectors being arranged side by side on the carrier board results in a compact arrangement. The surge arrester comprises an electrical conductor which runs at right angles to the first signal line portions. This prevents signals that are transmitted via the signal channels from being influenced by surge currents which may occur.

In order to ensure that surge currents or surge voltages are only arrested via the carrier board and not by components arranged on the carrier board, such as signal processing devices, a ground connection can be arranged on the carrier board, which ground connection is connected to the electrical conductor of the surge arrester.

As already mentioned, according to an advantageous embodiment, a first signal processing device can be plugged into each first connector, which signal processing device can perform at least one predetermined function.

It should be noted that at least one further connector for connection to a further signal processing device can be provided in each signal channel, it being possible for the further signal processing devices to perform different predetermined functions than the first signal processing devices. In this way, interface arrangements with a wide variety of functions can be constructed.

The above-mentioned technical problem is solved by the features of claim 4.

According to this, an interface arrangement is provided for connecting at least one control device to a plurality of field instruments, which comprises at least one first carrier board having a plurality of first signal channels, each of which has a first connecting device and a second connecting device, the first connecting devices each being designed for connection of a field instrument and the second connecting device being designed for electrical connection to the third connecting device of a second carrier board. Each first signal channel has an electrical interface which is designed for releasable connection of respective surge voltage protection modules and is arranged between the first and second connecting device of the respective signal channel. For this purpose, each interface can have at least two connecting contacts to which, for example, an electrical resistor can be connected. Each interface is connected to an electrical resistor. Furthermore, a surge arrester electrically connected to the interfaces is provided, which surge arrester is arranged at least partially on and/or in the at least one first carrier board and is designed for arresting surge voltages and/or surge currents which may occur, preferably only via the carrier board. The interface arrangement comprises a second carrier board having a plurality of second signal channels, each of which has a third connecting device and a fourth connecting device. The fourth connecting devices are designed for connection of at least one control device, while at least some of the third connecting devices are designed for electrical connection to the second connecting device of the at least one first carrier board. If the at least one first carrier board and the second carrier board are coupled to one another, there is an electrical connection between the second connecting devices and the third connecting devices. A first connector is arranged between the third and the fourth connecting device of each second signal channel, with the first connectors each being designed for electrical and mechanical connection to a second, complementary connector of a signal processing device.

A compact and space-saving interface arrangement results, for example, from the fact that the first signal channels of the at least one first carrier board are arranged parallel to one another, that each first signal channel has at least one first signal line portion which extends from the first connecting device of the respective first signal channel to the second connecting device and into which the electrical resistor of the respective signal channel is connected. In addition, the surge arrester comprises an electrical conductor which runs at right angles to the first signal line portions in order to prevent signal interference on the signal channels as a result of surge voltage or surge current.

In order to ensure that surge currents or surge voltages are only arrested via the first carrier board and not by components arranged on the first and/or second carrier board, such as signal processing devices, a ground connection can expediently be arranged on the at least one first carrier board, which ground connection is connected to the electrical conductor.

The interface arrangement can be used flexibly. Advantageously, a further first carrier board having a plurality of third signal channels can be provided for this purpose, each of which has a fifth connecting device and a sixth connecting device. The fifth connecting devices are designed for connection of a respective field instrument, while the sixth connecting devices can be designed for electrical connection to the remaining third connecting devices of the second carrier board. Each third signal channel has an electrical interface which is designed for releasable connection, preferably for plugging in a respective surge voltage module, and which is arranged between the fifth and sixth connecting device of the respective third signal channel. Each interface is connected to an electrical resistor. Furthermore, a surge arrestor electrically connected to the interfaces is provided, which surge arrestor is at least partially arranged on and/or in the further first carrier board and is designed for arresting surge voltages and/or surge currents which may occur, preferably only via the at least one further first carrier board.

The interface arrangements described above can each be designed for mounting on a mounting rail.

The surge protection modules can be designed as plug-in modules, with the interfaces then being designed to accommodate plug-in modules of this type.

As already mentioned, according to an advantageous embodiment, a first signal processing device can be plugged into each first connector, which signal processing device can perform at least one predetermined function.

It should be noted that at least one further connector for connection of a further signal processing device can be provided in each second signal channel, it being possible for the further signal processing devices to perform different predetermined functions than the first signal processing devices. In this way, interface arrangements with a wide variety of functions can be constructed.

BRIEF DESCRIPTION OF THE DRAWINGS

The invention is explained in more detail below with reference to two embodiments in conjunction with the accompanying drawings, in which.

DETAILED DESCRIPTION

It should be noted in advance that the index n used in the reference signs can be equal to 16, for example.

Figure 1:
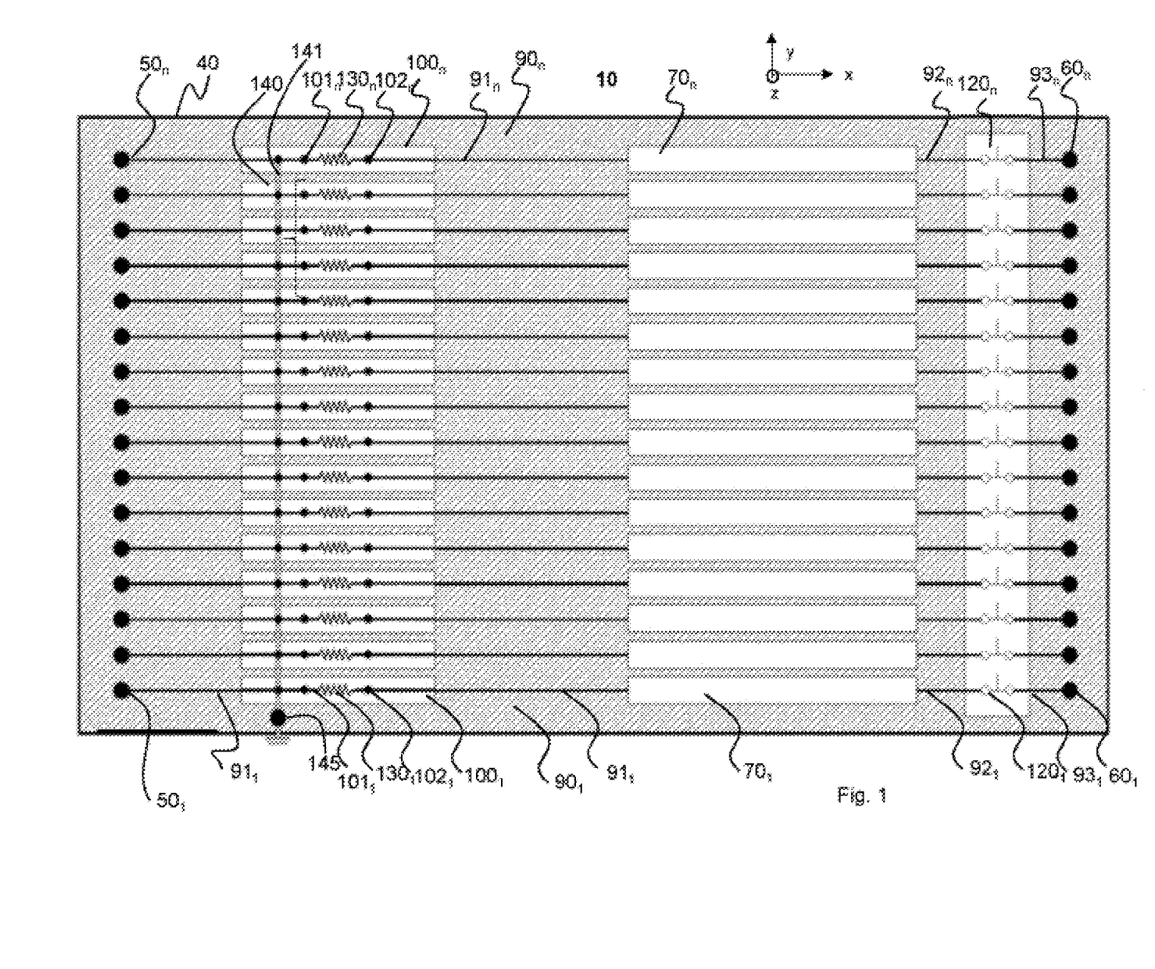
FIG. 1 is a plan view of an exemplary interface arrangement according to the invention.
Figure 2:
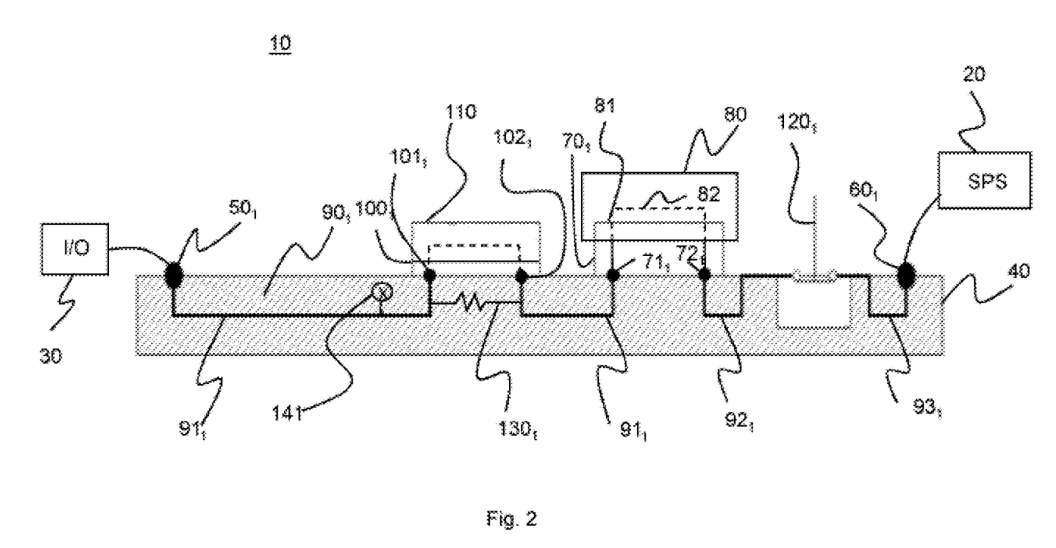
FIG. 2 is a cross-sectional view along the first signal channel of the interface arrangement shown in FIG. 1.

FIG. 1 shows an exemplary interface arrangement 10 which is designed for connecting a plurality of field instruments to at least one control device, with signals to and from the field instruments being sorted, processed and/or converted depending on the implementation. The field instruments can be sensors and/or actuators. The exemplary interface arrangement 10 comprises a carrier board 40 having a plurality of signal channels $90_1$ to $90_n$. A plurality of first connecting devices $50_1$ to $50_n$ are preferably arranged in the vicinity of the left-hand edge of the carrier board 40. The first connecting devices $50_1$ to $50_n$ are preferably arranged on an imaginary line that runs parallel to the y-axis of the coordinate system shown in FIG. 1 and thus perpendicular to the longitudinal axis of the carrier board 40. A field instrument can be connected to each first connecting device. Such a field instrument 30 is shown in FIG. 2 by way of example.

The signal channels $90_1$ to $90_n$ preferably run parallel to one another, specifically on imaginary lines that run parallel to the x-axis of the coordinate system shown in FIG. 1 and thus parallel to the longitudinal axis of the carrier board 40. Since the signal channels in the present example are substantially identical to one another, their structure is only described in more detail in connection with the signal channel $91_1$ for the sake of simplicity. The explanation of the signal channel $90_1$ is from left to right with respect to the interface arrangement 10 shown in FIG. 1.

The signal channel $90_1$ has the first connecting device $50_1$ which is preferably connected to a first electrical connector $70_1$ via a first signal line portion $91_1$. The first connector $70_1$ can be designed as a socket or plug of a plug-in connection. An interface $100_1$ is mounted on the carrier board 40 between the first connecting device $50_1$ and the first connector $70_1$. The electrical interface $100_1$ is designed for releasable accommodation of a surge protection module. The surge protection module is preferably designed as a plug-in module, so that the interface has a corresponding mechanical configuration in order to be able to accommodate plug-in modules. The electrical interface $100_1$ contains at least two electrical contacts $101_1$ and $102_1$ which can be connected to corresponding contacts of the surge protection module.

An electrical resistor $130_1$ is connected to the first signal line portion $91_1$ or to the contacts $101_1$ and $102_1$ of the interface $100_1$ so that the interface arrangement 10 can also be operated correctly without surge protection modules being plugged in. The electrical resistor $130_1$ ensures that an increased current caused by surge voltages flows through the plugged-in surge module via the interface $100_1$. The respective surge module is designed in such a way that it has a low resistance at high voltages, so that the current no longer flows through the resistor $130_1$ or only to a harmless extent. A surge arrester 140 is provided having an electrical conductor 141 which is electrically connected to each interface $100_1$ to $100_n$ or to the respective first signal line portions $91_1$ to $91_n$, so that the high currents that occur in the event of a surge voltage do not flow through the signal processing devices. The electrical conductor 141 is preferably connected to a ground connection 145 which is preferably arranged on the carrier board 40. As shown in FIG. 1, the ground connection 145 can be connected to ground or to a mounting rail (not shown) onto which the interface arrangement 10 can be latched.

As can also be seen in FIG. 1, the first signal line portion $91_1$ of the signal channel $90_1$ is connected to the connector $70_1$. In the example shown, the connector $70_1$ is connected indirectly to the second connecting device $60_1$ via a second signal line portion $92_1$, a manually operable safety device $120_1$ and a third signal line portion $93_1$.

The second connecting devices $60_1$ to $60_n$ are preferably located in the vicinity of the right-hand edge of the carrier board 40 and are arranged on an imaginary line that runs parallel to the y-axis of the coordinate system shown in FIG. 1. It is also conceivable to connect the connector $70_1$ directly to the second connecting device $60_1$ via the second signal line portion $92_1$. One advantage of the manually operable safety device $120_1$ is that the respective signal channel, here the signal channel $90_1$, can be interrupted directly by an operator in an emergency.

As can be seen in FIG. 1, the interface arrangement 10 has, for example, n=16 signal channels $90_1$ to $90_n$, 16 first connecting devices $50_1$ to $50_n$, 16 interfaces $100_1$ to $100_n$, 16 connectors $70_1$ to $70_n$ and, correspondingly, 16 second connecting devices $60_1$ to $60_n$, each of which is arranged on an imaginary line which runs parallel to the y-axis of the coordinate system shown in FIG. 1. All signal channels or second connecting devices $60_1$ to $60_n$ are designed to be connected to a control device, for example the programmable logic controller 20 shown in FIG. 2.

FIG. 2 is a cross-sectional view through the interface arrangement 10 shown in FIG. 1 along the first signal channel $90_1$.

FIG. 2 shows a cross-section through the carrier board 40 and a field instrument 30 connected to the first connection $50_1$, which can be a sensor or an actuator. As shown by way of example in FIG. 2, the first signal line portion $91_1$ of the signal channel $90_1$ runs within the carrier board 40 up to the first electrical contact $101_1$ of the interface $100_1$, continuing via the electrical resistor $130_1$, the second electrical contact $102_1$ of the interface $100_1$ to a first contact point $71_1$ of the first connector $70_1$. It can also be seen in FIG. 2 that a surge protection module 110 is plugged into the interface $100_1$. As already mentioned, the surge protection module $100_1$ serves to conduct a high current via the surge protection module 110 in the resistor $130_1$ in the event of a surge voltage.

Furthermore, a signal processing device 80 can be seen in FIG. 2, which is electrically and mechanically connected to the first connector $70_1$. For this purpose, the signal processing device 80 has a connector 81 designed to be complementary to the first connector $70_1$.

The second signal line portion $92_1$ runs from a second contact point $72_1$ of the first connector $70_1$, for example partially in and on the carrier 40 up to the manually operable safety device $120_1$. As can be seen from FIG. 2, the two signal line portions $91_1$ and $92_1$ are electrically connected to one another only when the signal processing device 80 is connected to the first connector $70_1$. An electrical connection of the signal channel $90_1$ is thus only established when the signal processing device 80 is electrically connected to the first connector $70_1$. A field instrument 30 acting as a sensor can then be fed to the signal processing device 80 via the signal line portion $91_1$, the electrical resistor $130_1$, processed accordingly by said signal processing device and then fed to the PLC 20 for further processing via the second signal line portion $92_1$, the manually operable safety device $120_1$, via the third signal line portion $93_1$ and via the second connecting device $60_1$.

The interface arrangement 10 ensures that the field instruments connected to the first connecting devices $50_1$ to $50_n$ can be assigned correctly to the corresponding inputs or outputs of the control device 20. Depending on the implementation, analog input signals of the sensor 30 can be fed to the signal processing device 80 via the signal channel $90_1$, converted there into digital signals and fed to a digital input of the control device 20 via the connecting device $60_1$. Similarly, depending on the implementation, analog output signals of the control device 20 can be fed to an actuator (not shown) having an analog input, for example via the signal channel $90_n$, via the second connecting device $60_n$, a signal processing device that is electrically connected to the connector $70_n$, and via the first connecting device $50_n$.

It should also be noted that the interfaces $100_1$ to $100_n$ can each be in the form of electrical plug or socket connectors.

Figure 3:
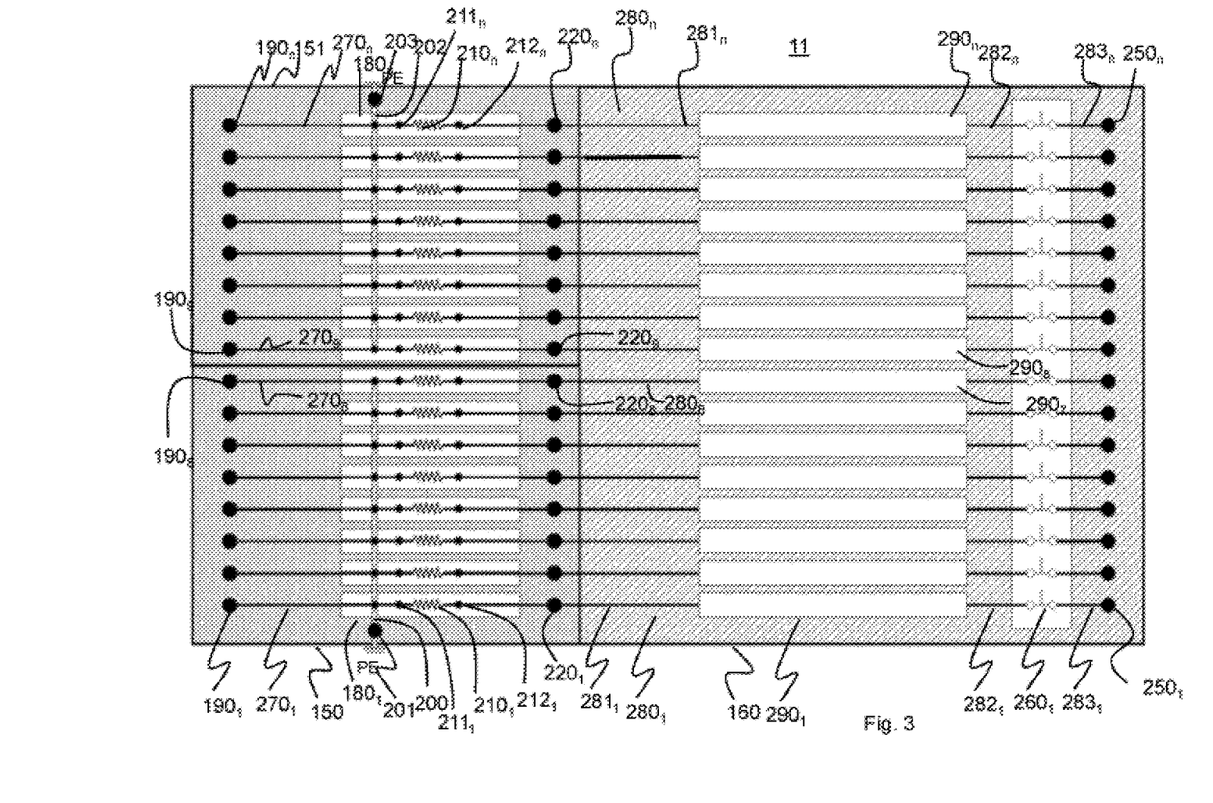
FIG. 3 is a plan view of an alternative exemplary interface arrangement according to the invention.
Figure 4:
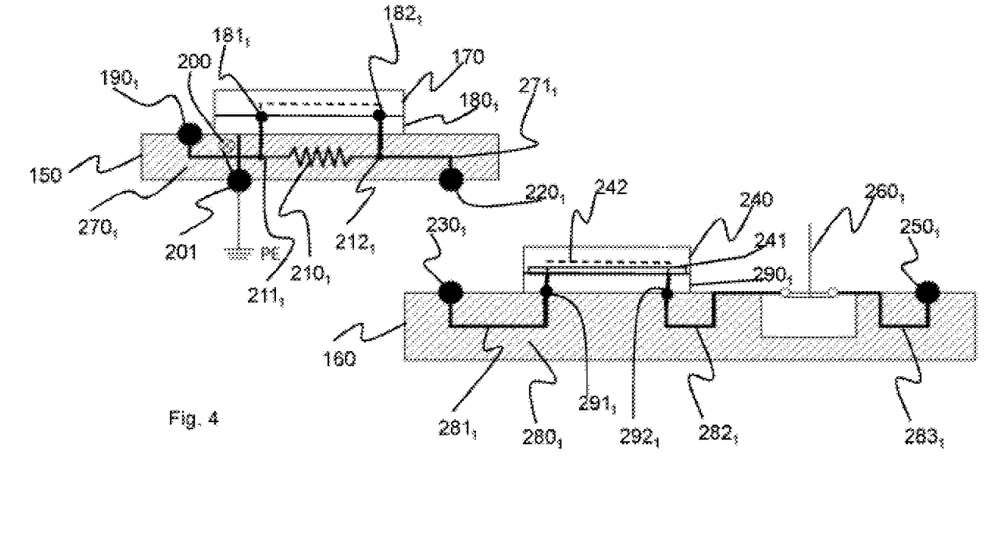
FIG. 4 is a cross-sectional view along the first signal channel of the interface arrangement shown in FIG. 3.

An alternative interface arrangement 11 is shown in FIGS. 3 and 4, which is designed for connecting a plurality of field instruments to at least one control device, with signals from and to the field instruments being sorted, processed and/or converted depending on the implementation.

One difference from the interface arrangement 10 is that the interface arrangement 11 has a plurality of carrier boards, which allow for a more flexible structure and thus easier adaptation to different areas of use and applications. For this purpose, interfaces $180_1$ to $180_n$ for connecting surge protection modules to at least one first carrier board 150 and electrical connectors $290_1$ to $290_n$ for connecting signal processing devices to a second carrier board 160 are arranged. FIG. 3 will be considered first.

FIG. 3 is a plan view of the alternative interface arrangement 11 without surge protection modules and without plugged-in signal processing devices, which are shown in FIG. 4.

The interface arrangement 11 has at least one first carrier board 150, which in turn has a plurality of first signal channels, for example eight signal channels $270_1$ to $270_8$. In the present example, the interface arrangement 11 has two first carrier boards, namely the carrier board 150 and a further carrier board 151, which in turn has a plurality of signal channels, for example also eight signal channels $270_9$ to $270_n$. The interface arrangement 11 thus has 16 signal channels.

Since the two carrier boards 150 and 151 can be of substantially the same design, only the structure of the carrier board 150 is explained in more detail below.

Each of the signal channels $270_1$ to $270_8$ preferably has a first connecting device in the vicinity of a first edge of the carrier board 150 and a second connecting device on the opposite edge of the carrier board 150. In other words, the signal channel $270_1$ has the first connecting device $190_1$ and the second connecting device $220_1$, while the eighth signal channel $270_8$ has a first connecting device $190_8$ and a second connecting device $220_8$. The first connecting devices $190_1$ to $190_8$ are designed for connection to a respective field instrument. The field instrument can be an actuator or a sensor with an analog or digital output. The second connecting devices $220_1$ to $220_8$ are designed in such a way that they can be electrically connected to third connecting devices $230_1$ to $230_8$ of the second carrier board 160. In the interface arrangement 11 shown by way of example in FIG. 3, the third connecting devices $230_1$ to $230_n$ are covered by the two carrier boards 150 and 151; however, they can be seen in FIG. 4. It should already be noted at this point that the two first carrier boards 150 and 151 and the carrier board 160 can alternatively each be connected at their end faces, in which case the second connecting devices $220_1$ to $220_n$ are then arranged, for example, at the outermost edge or at the end face of the carrier boards 150 and 151, while the third connecting devices $230_1$ to $230_n$ can be arranged on the extreme left-hand side of the carrier board 150 or on the end face thereof.

Each of the signal channels $270_1$ to $270_n$ has an electrical interface $180_1$ to $180_n$, each electrical interface being designed for releasable connection of a respective surge module. The interfaces $180_1$ to $180_8$ can in turn each be designed as a plug or socket connector.

The electrical interfaces $180_1$ to $180_8$ are arranged between the first connecting device and the second connecting device of the respective signal channel. For example, the electrical interface $180_1$ is arranged between the first connecting device $190_1$ and the second connecting device $220_1$. Each electrical interface is connected to an electrical resistor. Thus, the electrical interface $180_1$ is connected to an electrical resistor $210_1$ while the electrical interface $180_8$ is connected to an electrical resistor $110_8$. Furthermore, the first carrier board 150 has a surge arrester 200 which is arranged at least partially on and/or in the first carrier board 150 and is designed to arrest surge voltages and/or surge currents which may occur. In a similar manner, the further first carrier board 151 has a surge arrester 202 which is electrically connected to the interfaces $270_9$ to $270_n$.

In one embodiment, each first signal channel $270_1$ to $270_8$ of the carrier board 150 has at least one first signal line portion $271_1$ to $271_8$ which extends from the first connecting device of the respective first signal channel to the second connecting device. In other words, the signal line portion $271_1$ of the first signal channel $270_1$ extends from the first connecting device $190_1$ to the second connecting device $220_1$.

As can be seen in FIG. 3, the electrical resistors $210_1$ to $210_8$ are connected to the respective signal line portion $271_1$ or $271_8$ or to two electrical contacts $211_1$-$211_8$ and $212_1$-$212_8$ of the respective interface $180_1$-$180_8$. Furthermore, FIG. 3 shows by way of example that the surge arrester 200 comprises an electrical conductor which runs at right angles to the first signal line portions $271_1$ to $271_8$. In other words, the electrical conductor of the surge arrester 200 is aligned on an imaginary line that is arranged parallel to the y-axis, while the signal line portions $271_1$ to $271_8$ run parallel to the x-axis of the coordinate system shown in FIG. 3. A ground connection 201, which is connected to the electrical conductor of the surge arrester 200, can be arranged on the first carrier board 150. Similarly, a further ground connection 203 can be arranged on the further first carrier board 151, which is electrically connected to the electrical conductor of a surge arrester 202.

The carrier board 151 has the remaining signal channels $270_9$ to $270_n$ which, as mentioned above, can be constructed substantially identically to the signal channels $270_1$ to $270_8$ that have been described above. As FIG. 3 shows, the first connecting devices $190_1$ to $190_n$, the interfaces $180_1$ to $180_n$ and the second connecting devices $220_1$ to $220_n$ are each arranged on an imaginary line that runs parallel to the y-axis of the coordinate system shown in FIG. 3.

It should be noted at this point that the two first carrier boards 150 and 151 and the second carrier board 160 can be designed so as to be electrically and mechanically coupled to one another. For this purpose, the carrier boards can have corresponding latching elements which allow the carrier boards to be mechanically fixed and held together.

The second carrier board 160 has a plurality of second signal channels $280_1$ to $280_n$, which in turn each have one of the third connecting devices and each have a fourth connecting device and are arranged in alignment with the first signal channels $270_1$ to $270_n$ in the coupled state. For example, the second signal channel $280_1$ has the third connecting device $230_1$ and the fourth connecting device $250_1$. As already mentioned, the third connecting devices $230_1$ to $230_n$ are intended to be electrically connected to the second interfaces $220_1$ to $220_n$ of the two first carrier boards 150 and 151. At least one control device can be connected to the carrier board 160 at the fourth connecting devices $250_1$ to $250_n$. It should also be noted that both the signal channels $270_1$ to $270_n$ and the signal channels $280_1$ to $280_n$ substantially run parallel to one another, i.e. parallel to the x-axis of the coordinate system shown in FIG. 3.

As FIG. 3 shows, when installed, the second connecting devices $220_1$ to $220_8$ of the first carrier board 150 are connected to the corresponding third connecting devices, of which only the connecting device $230_1$ is shown in FIG. 4, while the second connecting devices $220_9$ to $220_n$ of the first carrier board 151 are electrically connected to the corresponding third connecting devices on the carrier board 160.

Furthermore, an electrical connector $290_1$ to $290_n$ is arranged between the third and fourth connecting device of each second signal channel $280_1$ to $280_n$. For example, the connector $290_1$ is arranged between the third connecting device $230_1$ and the fourth connecting device $250_1$ of the signal channel $280_1$. The connectors $290_1$ to $290_n$ can each be implemented as plugs or sockets and designed for electrical and mechanical connection to a second, complementary connector of a signal processing device. A corresponding complementary connector 241 is shown with regard to a signal processing device 240 in FIG. 4.

Each second signal channel $280_1$ to $280_n$ can have a first signal line portion, which extends from the first connecting device of the respective signal channel to a first electrical contact of the respective connector, and at least one second signal line portion, which extends from a second electrical contact of the respective electrical connector either directly or indirectly via a safety device $260_1$-$260_n$ to the respective fourth connecting device. Referring to the second signal channel $280_1$, its first signal line portion $281_1$ extends from the third connecting device $230_1$ to the first electrical contact $291_1$ of the electrical connector $290_1$, while the second electrical contact $292_1$ of the electrical connector $290_1$ is connected to the fourth connecting device $250_1$ via a signal line portion $282_2$, the safety device $260_1$ and a further signal line portion $283_1$. As can be seen in FIG. 3, the further signal channels $280_2$ to $280_n$ are of substantially identical design to the signal channel $280_1$. In other words, each electrical connector $290_1$-$290_n$ is preferably connected to the respective fourth connecting device $250_1$-$250_n$ via one of the manually operable safety devices $260_1$ to $260_n$.

FIG. 4 is a cross-sectional view of the interface arrangement 11 shown in FIG. 3 along the signal channels $270_1$ and $280_1$, with the first carrier board 150 and the second carrier board 160 being shown in the separated state.

FIG. 4 shows the carrier board 150 in cross-section with the first connecting device $190_1$, which is attached as a connecting contact on the upper side of the carrier board 150. Also shown is the second connecting device $271_1$, which is arranged, for example, on the underside of the carrier board 150. The connecting device $190_1$ is connected to the connecting device $220_1$ via the signal line portion $271_1$, the signal line portion $271_1$ preferably running in the carrier board 150. The electrical resistor $210_1$ is connected to the signal line portion $271_1$ via its connecting contacts $211_1$ and $212_1$, which in turn can be electrically connected to the contacts $181_1$ and $182_1$ of the interface $180_1$, which is arranged on the upper side of the carrier board 150.

As can be seen further in FIG. 4, the signal line portion $271_1$ is connected to the electrical conductor of the surge arrester 200 which in turn is connected to the ground connection 201. The ground connection 201 can, for example, be electrically connected to ground or a top hat rail in order to be able to divert surge currents caused by surge voltage.

FIG. 4 also shows a surge protection module 170, which can be designed in the form of a plug-in module. The interface $180_1$ is preferably designed to accommodate plug-in modules. Currents caused by surge voltages are substantially routed through the surge protection module 170, which is indicated by the dashed line in the surge protection module 170.

Furthermore, FIG. 4 shows a cross-section through the second carrier board 160, specifically along the signal channel $280_1$.

The third connecting device $230_1$ and the fourth connecting device $250_1$ are arranged on the upper side of the carrier board 160. The first signal line portion $281_1$ preferably runs within the carrier board 160 and connects the third connecting device $230_1$ to the contact $291_1$ of the electrical connector $290_1$. The second signal line portion $282_1$ preferably runs in segments within the carrier 160 and in segments on the carrier 160 and connects the contact $292_1$ of the electrical connector $290_1$ to a first contact of the manually operable safety device $260_1$. The third signal line section $283_1$ preferably runs in segments within the carrier 160 and in segments on the carrier 160 and connects a second contact of the manually operable safety device $260_1$ to the connecting device $250_1$.

Furthermore, FIG. 4 shows the signal processing device 240 which is electrically and mechanically connected to the connector $290_1$ and has an electrical connector 241 which is complementary to the connector $290_1$. According to an advantageous embodiment, the signal line portion $281_1$ is only electrically connected to the signal line portion $282_1$ when the signal processing device 240 is electrically connected to the connector $290_1$ mounted on the carrier board 160. This state is represented symbolically by the dashed line 242. In other words, only in the mounted state can field signals from a field instrument connected to the connecting device $190_1$ reach the fourth connecting device $250_1$, a predetermined signal processing and/or signal conversion being performed in the signal processing device 240.

The invention claimed is:

1. An interface arrangement for connecting at least one control device to a plurality of field instruments, comprising:
    a carrier board having a plurality of signal channels, each one of the signal channels having a first connecting device and a second connecting device, the first connecting device configured for connecting to a respective field instrument and the second connecting device configured for connecting to the at least one control device,
    a connector configured for electrically and mechanically connecting to a complementary connector of a signal processing device, arranged between the first and the second connecting device of each one of the signal channels, and
    each signal channel having an electrical interface configured for releasable connection of respective surge protection modules and being arranged on the carrier board between the connector and the first connecting device, each interface being connected to an electrical resistor, and
    a surge arrester electrically connected to the electrical interface of each one of the signal channels, and arranged at least partially on the carrier board, or arranged at least partially in the carrier board, or arranged at least partially on and in the carrier board, the surge arrester configured for arresting surge voltages and/or surge currents that may occur.

2. The interface arrangement according to claim 1, wherein the signal channels are arranged parallel to one another, and each one of the signal channels has at least one first signal line portion that electrically connects the first connecting device of the signal channel to the connector and into which the electrical resistor of the signal channel is connected,
    wherein each one of the signal channels has at least one second signal line portion that electrically connects the second connecting device of the signal channel directly or indirectly to the connector, wherein the connectors are arranged side by side on the carrier board, and wherein the surge arrester comprises an electrical conductor that runs at right angles to the first signal line portions.

3. The interface arrangement according to claim 2, further comprising:
    a ground connection, which is connected to the electrical conductor, is arranged on the carrier board.

4. An interface arrangement for connecting at least one control device to a plurality of field instruments, comprising:
    at least one first carrier board having a plurality of first signal channels, each one of the first signal channels having a first connecting device and a second connecting device, the first connecting device configured for connecting to a respective field instrument and the second connecting device configured for electrically connecting to a third connecting device of a second carrier board, and
    each one of the first signal channels having an electrical interface configured for connecting to a surge protection module and arranged between the first and the second connecting devices of the first signal channel, and
    each interface connected to an electrical resistor, a surge arrester electrically connected to the electrical interface of each one of the signal channels and arranged at least partially on the at least one first carrier board, or arranged at least partially in the at least one carrier board, or arranged at least partially on and in the at least one carrier board, the surge arrester configured for arresting surge voltages and/or surge currents that may occur, the second carrier board having a plurality of second signal channels, each one of the second signal channels having the third connecting device and a fourth connecting device, the fourth connecting devices of the second signal channels configured for connecting to the at least one control device and at least some of the third connecting devices, and configured for electrically connecting to the second connecting devices of the at least one first carrier board, wherein, when the at least one first carrier board and the second carrier board are coupled to one another, an electrical connection is established between the second connecting device and the third connecting device, and a connector arranged between the third and the fourth connecting devices of each one of the second signal channels, the connector configured for electrically and mechanically connecting to a complementary connector of a signal processing device.

5. The interface arrangement according to claim 4, wherein the first signal channels of the at least one first carrier board are arranged parallel to one another, wherein each one of the first signal channels has at least one first signal line portion that extends from the first connecting device of the first signal channel to the second connecting device and into which the electrical resistor of the first signal channel is connected, and wherein the surge arrester has an electrical conductor that runs at a right angle to the first signal line portion.

6. The interface arrangement according to claim 5, further comprising:
a ground connection connected to the electrical conductor and arranged on the at least one first carrier board.

7. The interface arrangement according to claim 4, further comprising:
a further first carrier board having a plurality of third signal channels, each one of the third signal channels having a fifth connecting device and a sixth connecting device, the fifth connecting device configured for connecting a respective field instrument and the sixth connecting devices of the third signal channels configured for electrically connecting to the third connecting devices of the second carrier board not connected to the fourth connecting devices of the second signal channels, each one of the third signal channels having an electrical interface that is configured for connecting to respective surge protection modules and arranged between the fifth and the sixth connecting devices of the third signal channel, each interface connected to an electrical resistor, and a surge arrester electrically connected to the interfaces, the surge arrester arranged at least partially on the further first carrier board or arranged at least partially in the further first carrier board, or arranged at least partially on and in the further first carrier board and configured for arresting the surge voltages and/or the surge currents that may occur.

8. The interface arrangement according to claim 4, wherein the second signal channels are arranged parallel to one another, each one of the second signal channels has at least one first signal line portion that electrically connects the third connecting device of the second signal channel to the respective connector, wherein each one of the second signal channels has at least one second signal line portion that electrically connects the fourth connecting device of the second signal channel directly or indirectly to the respective connector, and wherein the connectors are arranged side by side on the carrier board.

9. The interface arrangement according to claim 4, wherein the interface arrangement is designed as a wiring and/or signal converting means.

10. The interface arrangement according to claim 4, wherein the interface arrangement is designed for mounting on a mounting rail.

11. The interface arrangement according to claim 4, wherein the interfaces are designed to accommodate the surge protection modules designed as plug-in modules.

12. The interface arrangement according to claim 1, wherein the interface arrangement is designed as a wiring and/or signal converting means.

13. The interface arrangement according to claim 1, wherein the interface arrangement is designed for mounting on a mounting rail.

14. The interface arrangement according to claim 1, wherein the interfaces are designed to accommodate the surge protection modules designed as plug-in modules.

* * * * *